March 29, 1955 W. W. P. STELTER 2,705,012
AUXILIARY FEED MECHANISM FOR CORN HUSKERS
Filed Jan. 12, 1952 2 Sheets-Sheet 1
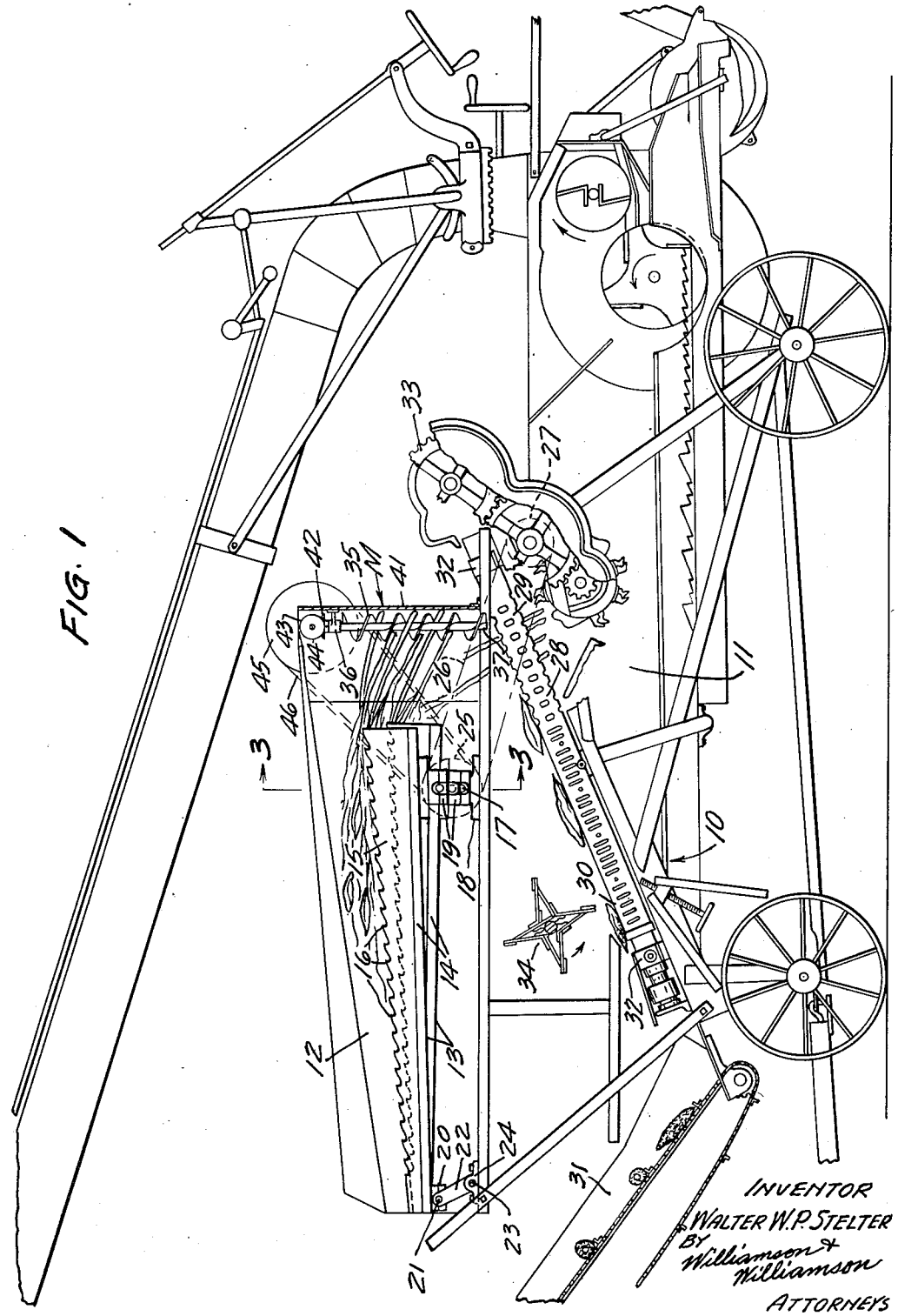

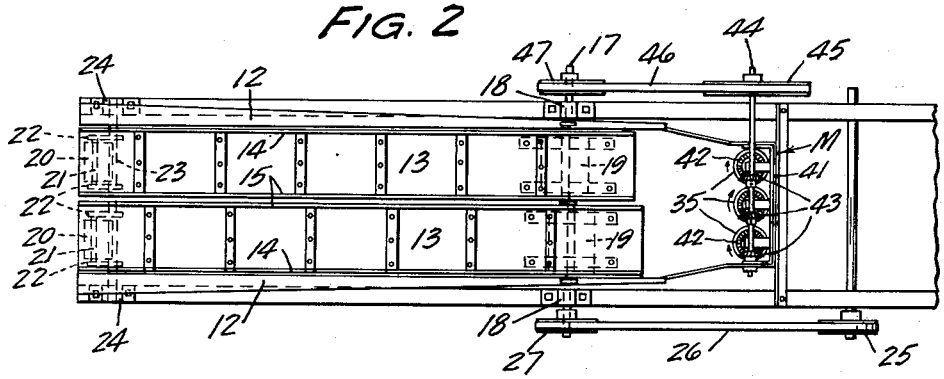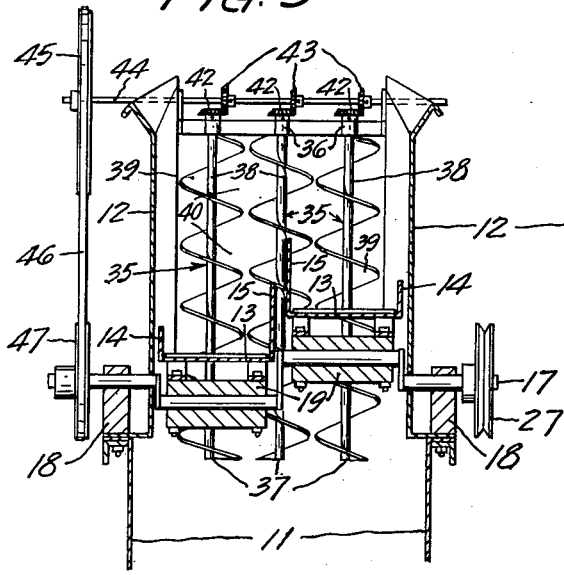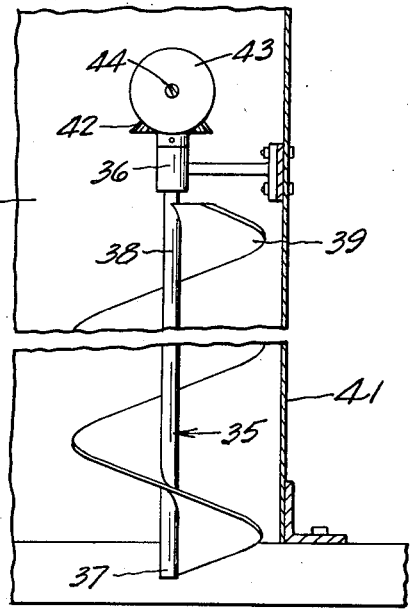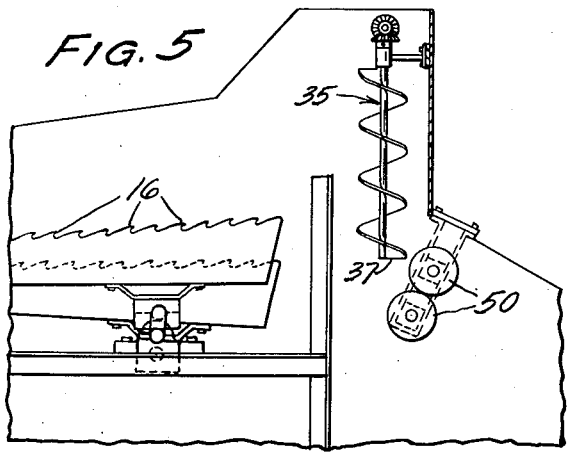

United States Patent Office 2,705,012
Patented Mar. 29, 1955

2,705,012

AUXILIARY FEED MECHANISM FOR CORN HUSKERS

Walter W. P. Stelter, Echo, Minn.

Application January 12, 1952, Serial No. 266,145

11 Claims. (Cl. 130—33)

This invention relates to corn husking machines. More particularly, it relates to corn husking machines of the self-feeding type.

The use of combined husking and snapping rolls in combination with self-feeding decks in corn husking machines has presented a problem in arriving at a structure which will properly feed the stalks into the rolls. Generally, these rolls are inclined and positioned below and slightly forwardly of the self-feeding decks. The optimum orientation of the stalks relative to these rolls to insure their passage therebetween is at right angles to the bight which is formed by the rolls. But in order to so orient the stalks, auxiliary mechanism over and above the conventional self-feeding decks are required. Certain auxiliary feed mechanism have been invented previously as disclosed in Patent No. 2,538,914 issued to H. L. Rosenthal, January 23, 1951. Such mechanisms, however, have not proven entirely effective and satisfactory since they compress the stalks instead of spreading them immediately prior to their passage through the rolls and hence the snapping operation is hindered and the progression thereof through the rolls is retarded. The result is that a less efficient snapping operation is performed, more corn is shelled from the ears than is necessary, and the entire operation is performed at a slower rate than is necessary.

Other devices such as slat conveyors have been used to facilitate the self-feeding operation but in such devices the stalks are not engaged immediately upon contact with the device because the channels are not deep enough to positively engage the stalks. Once they are engaged the stalks frequently slip beneath the slats, are carried around by the conveyor, and cause the conveyor to slip or jump off its drive sprockets. Such conveyors are also incapable of forcing frozen stalks and the like into the rolls when such stalks work upwardly along the rolls as they normally do during the husking operation. Since such a conveyor is positioned to extend diagonally past the end of the rolls it is not capable of pressing such stalks directly into the bight of the rolls with the result that such material accumulates around the upper end portion of the rolls and slows or completely terminates the self-feeding operation. Once this stalk has moved to a transverse position relative to the rolls, such a conveyor does not tend to rearrange the stalk but instead merely re-presents the same to the rolls with the stalk orientated in the same manner and hence incapable of passing therethrough. Also, such a conveyor tends to cause the entire corn bundle to be drawn through the rolls at one time with a consequent inefficient snapping operation.

In my application for patent entitled "Self-Feeder for Corn Shredders," S. N. 163,027, filed May 19, 1950, I disclosed and claimed a novel and improved self-feeding deck for corn husking machines. The decks disclosed in that application work very satisfactorily and in an improved manner. I have found, however, that I can improve the efficiency of the self-feeding operation to a limited extent under optimum operating conditions and to a very substantial extent under certain unusual and disadvantageous husking conditions and also when the decks are used in conjunction with combined husking and snapping rolls. I accomplish this by providing an auxiliary feeding mechanism which spreads the corn bundle and presents the stalks to the rolls in an improved manner. This auxiliary feed mechanism is disclosed and claimed herein in combination with the self-feeding decks claimed in the above entitled application, and hence this application is a continuation of that application.

It is a general object of my invention to provide a novel and improved self-feeding mechanism for corn husking machines.

A more specific object is to provide a novel and improved self-feeding mechanism which will function in an efficient manner in corn husking machines regardless of whether the machine uses combined or separated husking and snapping rolls and regardless of the conditions under which the husking operation is to be conducted.

Another object of my invention is to provide an improved self-feeding mechanism for corn husking machines which will positively engage the stalks of corn and orient the same so as to present them to the husking and snapping rolls in an improved manner.

Another object is to provide an improved self-feeding mechanism for corn husking machines which will progressively and positively engage portions of the corn bundle and spread the same prior to presenting the stalks to the snapping rolls for passage therebetween.

Another object is to provide an improved self-feeding mechanism for corn husking machines which will continuously stir, rearrange and re-present the corn stalks into the bight between the snapping rolls in the event that they extend transversely thereto when they first reach the rolls.

Another object of my invention is to provide an improved self-feeding mechanism for corn husking machines which will positively press frozen corn stalk material and the like directly into the bight between the rolls which perform the snapping function.

Another object is to provide an improved self-feeding mechanism for corn husking machines which will tilt the stalks of corn to a substantially vertical position and at right angles to the bight between the rolls performing the snapping function.

Another object is to provide a self-feeding mechanism for corn-husking machines constructed to form pockets between its elements for positively engaging and carrying portions of a corn stalk bundle downwardly and directly into the bight between the rolls performing the snapping function.

Another object is to provide a self-feeding mechanism for corn husking machines which, instead of compressing the contents of the corn bundle together immediately prior to its entrance into the bight between the snapping rolls, will tend to spread the contents of the bundle and thus enable the snapping rolls to operate more efficiently.

Another object is to provide an improved self-feeding mechanism for corn husking machines which will present the corn stalks to the snapping rolls in such a manner as to produce a minimum of shelled corn.

These and other objects and advantages of my invention will more fully appear from the following description made in connection with the accompanying drawings, wherein like reference characters refer to similar parts throughout the several views, and in which:

Fig. 1 is a side elevational view of a corn husking machine utilizing one embodiment of my invention in combination with combined husking and snapping rolls, one side portion of the machine being broken away to show the interior thereof;

Fig. 2 is a plan view of the self-feeding mechanism of the machine shown in Fig. 1;

Fig. 3 is an enlarged sectional view taken along approximately line 3—3 of Fig. 1 and showing the auxiliary feed mechanism in elevation;

Fig. 4 is a detailed side elevational view on an enlarged scale of one of the augers which form the auxiliary feed mechanism; and Fig. 5 is a fragmentary side elevational view of a corn husking machine utilizing one embodiment of my invention in combination with a pair of snapping rolls separated from the corn husking rolls, one side portion of the machine being broken away to show the interior thereof.

In corn shredders of the type previously known, the retarding means which was used to prevent clogging of the machine and to attempt to spread the contents of the corn bundle generally consisted of elements disposed in spaced relation above the forward portion of the feed decks. These retarding means usually rotated about an axis transverse of the feed decks and acted upon the upper strata of the corn bundle and stalk material as said material moved beneath the retarding means. I have found that by eliminating these retarding elements from above the forward portion of the feed decks and by providing upstanding helicoid screws spaced forwardly from the forward ends of the feed decks and turning on an axis depending downwardly to within closely spaced relation above the bight between the snapping rolls, an entirely new feeding principle is developed. I have found that such a screw or auger, while eliminating the transverse retarding elements which tended to compact the material, will engage the forward ends of the material at a point spaced forwardly from the forward ends of the feed decks, will anchor the material within their flights, and will move the forward ends of the stalks or material downwardly into the bight of the snapping rolls. At the same time, due to the fact that in a corn bundle some stalks always extend forwardly farther than others, the respective stalks of the corn bundle are engaged positively at different times and hence the bundle is spread rather than compacted.

One embodiment of my invention may include, as shown in Figs. 1–4, a wheeled frame 10 having panels 11. The forward end of the wheeled frame will be considered to be the end portion at the right of Fig. 1 since the corn stalks will move in that direction. The left side panel of the machine is the only panel shown since the right side panel has been removed to disclose the interior of the machine. The paneled frame 10 is open at its upper side from the rear of the frame forwardly to a point adjacent the auxiliary feed mechanism which has been indicated generally as M in Fig. 1. Rising from the side paneling 11 of the machine at the two sides of the opening provided are side boards 12 which form the side walls of a trough running from the rear end of the machine to a point directly ahead of the auxiliary feed mechanism.

Between the two side boards 12 there are located below the upper edges of these boards a pair of feed decks or conveyors 13, these decks extending from adjacent the rear end of the machine forwardly and having discharge terminals spaced somewhat rearwardly from the auxiliary feed mechanism M. These decks form the bottom of the trough, the sides of which are formed by the side boards 12. The two decks 13 are located in side by side relation and each deck has an upwardly turned short outer flange 14 and an upwardly turned inner flange 15. The upper edges of the flanges 14 are serrated to form forwardly and upwardly inclined teeth 16 which have the function of working into the bundles of corn thrown onto the decks 13 and of catching and breaking the cords carrying these bundles. The toothed flange 15 also has the function of distributing the corn stalks after the cords have been cut generally longitudinally of the decks and they also act to advance the material along the decks toward the auxiliary feed mechanism M. Preferably, the inner flanges 15 of the decks are of greater height adjacent the forward ends of the decks than adjacent the rear ends thereof, the serrated edges 16 accordingly being inclined somewhat upwardly and forwardly from the rear portions of the decks.

Below the discharge terminals or forward portions of the decks 13 a double-throw crank shaft 17 is mounted in suitable bearings 18 carried by the upper portions of the frame 10. Each deck 13 carries a suitable depending bearing 19 through which one crank portion of the crank shaft extends and the two crank shaft portions are diametrally opposed to each other. The crank shaft 17 will be rotated in a clockwise direction as viewed in Fig. 1 and through the medium of the crank shaft the portions of the deck 13 will be given a differently timed gyratory movement in a direction first upwardly, then forwardly, then downwardly, and then rearwardly consecutively in respect to the auxiliary feed mechanism M. This movement and its advantages are more clearly brought out in the application of which the instant application is a continuation and which has been referred to hereinbefore. This movement, however, is highly important in causing proper feed of the material forwardly to the auxiliary feed mechanism M.

The rear portions of the two decks 13 carry depending bearings 20 respectively receiving pivot pins 21 connected to swinging arms 22 mounted for independent swinging movement on a cross shaft 23 extending between and carried by brackets 24 mounted at the rear portions of the upper members of the frame 10.

A drive pulley 25 is mounted on one end of the crank shaft 17 and is driven by a V-belt 26 which in turn extends around and is driven by a main drive 27.

Disposed below the feed decks 13 are a plurality of pairs of oppositely rotating combined husking and snapping rolls 28. As best shown in Fig. 1, these combined husking and snapping rolls are inclined and parallel, the receiving end portions 29 of which are at a considerably elevated level relative to the discharging end portions 30. This type of combined husking and snapping rolls are well-known in the art as described in the Rosenthal patent referred to hereinbefore and since no particular feature of the same is claimed herein it is not considered necessary to describe them in greater detail. It is sufficient to say that the receiving portion 29 of these rolls functions to snap the corn ears free from their stalks as they pass between the rolls and that thereafter the ears gradually work downwardly within the bight formed between each pair of rollers, the ears being husked as they move downwardly until they are discharged into the ear elevator 31 which carries them rearwardly into any suitable receptacle such as a wagon box. Each of the rolls 28 is mounted for rotation at its free end in bearings 32 and is driven by a gear mechanism indicated generally as 33 so that the rolls in each pair will rotate in opposite directions. Each pair of rolls 28 is closely adjacent to each other. As shown in Fig. 1, the rolls are disposed so that the forward and upper receiving portions 29 extend slightly ahead of the feed decks 13 and somewhat therebelow. A beater 34 is provided adjacent the discharge end portion of the rolls 28 to kick forwardly any unhusked ears or stalks which may by chance have worked rearwardly along the rolls.

The auxiliary feed mechanism M wherein lies my invention in combination with the conventional portions of a corn husking machine as previously described, is comprised of a plurality of vertically extending cooperating augers 35. Fig. 3 shows these augers mounted closely adjacent to each other and parallel. They are rotatably mounted in bearings 36 by their upper end portions and their lower ends 37 are free and otherwise unsupported. The main body 38 of the augers carries flights 39 which extend in close proximity to each other and are arranged relative to each other so that when they are rotated in the same direction they form pockets 40 therebetween. In other words, as they rotate the flights move at the same rate of speed to carry any material which has been engaged within the pockets 40 downwardly in a positive manner. A panel 41 extends across the back of the augers 35 and supports the bearings 36 within which the upper portions of the augers 35 are rotatably mounted.

The upper ends of the augers 35 carry bevel gears 42 which cooperate with other bevel gears 43 carried by a countershaft 44. This countershaft 44 is provided with a drive pulley 45 driven by a belt 46 which passes around a drive pulley 47 mounted on the other end of the crank shaft 17 from the drive pulley 25. The bevel gears 39 and 40 and the belts 43 and 26 are arranged so that the augers 35 rotate in the same direction and at the same speed.

Fig. 5 shows my invention utilized in conjunction with a corn husking machine wherein the snapping rollers 50 are mounted separately from the husking rolls (not shown). The remaining portions of the machine are constructed identically with the portions described in Figs. 1–4 and are numbered accordingly. It should be noted that the lower ends 37 of the augers 35 are also free in this embodiment and are positioned ahead of the snapping rolls 50 and slightly above the bight formed between the rollers. This positioning of the lower ends is important, especially under adverse corn husking conditions since the lower ends function to positively thrust the corn stalks into the bight between the snapping rolls. It should be noted that in both embodiments the lower ends of the augers are in close proximity to the bight between the rolls which performs the snapping function. In Fig. 1 the lower ends of the augers are positioned directly above and in close proximity to the bight between the rolls. Thus, it can be seen that my invention may be utilized equally well with either type of corn husking machine regardless of whether the machine uses combined husking and snapping rolls or snapping rolls which are separated from the husking rolls.

In operation, the corn stalks are worked forwardly by the teeth 16 and the decks 13. The teeth will sever the cords around the bundles as described in my previous application referred to herein, and the forward or butt ends of the corn stalks will be carried forwardly into the auxiliary feed mechanism M. The forward-most stalk will be engaged first as it is thrust into one of the pockets 40 and will be carried downwardly within the pocket and toward the bight between the rolls performing the snapping function. The butts of the corn stalks which did not extend as far forwardly will be engaged at a later point of time by a pocket formed by the succeeding flights 39. Thus, it can be seen that the cooperating flights tend to positively spread the corn bundle rather than to compact the same.

By the time the butt end of the corn stalk has been carried to the lower and free end of the auger the stalk will be oriented in a position approaching vertical and will be presented to the snapping portion of the rolls 29 at an angle substantially normal to the rolls. It is well-recognized in the art that this is the optimum angle of presentation since the stalk will be more likely to be positively engaged immediately upon its contact with the roll and drawn therebetween as desired. Fig. 1 brings the orientation of the stalks out more clearly and also illustrates the manner in which the corn stalks of a corn bundle tend to be spread by the augers.

It is believed to be clear that the obvious result of the spreading action of the augers means that a more uniform feeding will be provided for the snapping portions 29 of the rolls and hence a more efficient snapping operation will result. It is well-recognized that when corn stalks are thrust through snapping rolls in bulky accumulations an inefficient snapping process results and an unnecessary amount of shelled corn is produced. When a stalk is presented to the rolls substantially individually the snapping function is clean-cut with little shelled corn resulting and a minimum of power is required. When the stalks are presented in groups or in large clumps a maximum of power is required, an unnecessary amount of corn is shelled, and some of the smaller ears may even pass through the rolls and be lost.

When the husking operation is being conducted under adverse conditions such as when the corn stalks are frozen or laden with ice and snow, it oftentimes occurs that such stalk will not be engaged by the rolls unless some positive means is provided for thrusting them into the bight between the rolls. My auxiliary feed mechanism does exactly this without compressing the entire bundle. When a frozen corn stalk is carried downwardly within the pockets 40 and reaches the lower end of the auger 35, it is forced directly into the bight between the rolls 28 so that it will be drawn through the rolls without delay. This prevents clogging in the machine and eliminates a substantial loss of time which would otherwise result through the manual removing of such material. In either embodiment shown, the material is delivered directly into the bight between the rolls with a result that corn stalks under low adverse conditions will readily pass between the rolls performing the snapping function.

In the event that a stalk of corn extends transversely to the bundle and hence is presented in that manner to the auxiliary feed mechanism, the stalk will be rearranged and re-presented by the rotating flights 39 of the augers. This is a problem which has constantly confronted manufacturers of corn husking machines since it seems that once a stalk has become arranged transversely with respect to the rolls in a corn husking machine, none of the devices previously known have been constructed to rearrange and re-present the stalk under different conditions to the rolls. As a result, the transversely extending stalk will lie for extended periods across the rolls, hindering the husking operation, both in efficiency and by slowing down the progress of the material through the rolls. An important advantage of my invention is that the flights constantly stir the material and tend to rearrange the same so that even though a stalk does become lodged transversely with respect to the rolls, it will very shortly be rearranged and re-presented to the rolls oriented in a proper manner.

Thus, it can be seen that I have provided an auxiliary feed mechanism which may be readily used with either type of corn husking machine and which, when so utilized, will accomplish the corn husking operation in an improved and superior manner. It should be noted that my auxiliary feed mechanism when used in combination with a self-feeding deck presents the material oriented most favorably with respect to the rolls, tends to spread rather than compress the material contained within the corn bundle, and positively urges the material directly into the bight between the rolls. It should also be noted that the augers positively press frozen material directly into the rolls to cause the same to readily pass therethrough.

Another important advantage of my auxiliary feeder is that a minimum of shelled corn results when it is used. I have found that the amount of shelled corn is reduced about 85 per cent of that previously produced when other auxiliary feed mechanisms are used. Another advantage is that my mechanism continuously tends to stir, rearrange and re-present the material to the rolls to facilitate and expedite the passage of the material through such rolls.

It will, of course, be understood that various changes may be made in the form, details, arrangement, and proportions of the various parts without departing from the scope of my invention.

What I claim is:

1. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and being disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls.

2. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls.

3. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, said auger conveyor having a free lower end portion terminating immediately above the bight between said rolls and urging the corn stalks through said rolls.

4. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and being disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, said rolls having receiving end portions and discharging end portions, said receiving end portions being disposed at a higher elevation than said discharging end portions and being disposed directly below the discharge terminal of said stalk conveyor.

5. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, said auger conveyor having an upper end portion and a lower end portion and being mounted for rotation by its upper end portion only.

6. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, said auger conveyor being disposed substantially vertically in the path of the forwardly moving stalks being conveyed by said stalk conveyor and engaging the stalks and spreading them and directing them downwardly into the bight between said rolls.

7. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, mechanism for rotating said auger conveyor to cause the same to engage the forward ends of the corn stalks as they move forwardly from the discharge terminal of said stalk conveyor and direct them downwardly through said rolls, and a cooperating upright auger conveyor mounted for rotation about its longitudinal axis adjacent said first mentioned auger conveyor and cooperating therewith to engage the corn stalks and urge the same downwardly into the bight between said rolls.

8. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and forming a bight therebetween which is disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longiitudinally upwardly from a point adjacent the receiving side of said rolls to a level above the discharge terminal of said stalk conveyor, mechanism for rotating said auger conveyor to cause the same to engage the forward ends of the corn stalks as they move forwardly from the discharge terminal of said stalk conveyor and direct them downwardly through said rolls, and a cooperating upright auger conveyor mounted for rotation about its longitudinal axis adjacent said first mentioned auger conveyor and cooperating therewith to engage the corn stalks and urge the same downwardly into the bight between said rolls, each of said auger conveyors having upper and lower end portions and each being mounted for rotation by its upper end portion and having its lower end portion free and otherwise unsupported and adjacent to said rolls.

9. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and being disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, each of said rolls having a receiving end portion disposed directly below the discharge terminal of said stalk conveyor and each extending downwardly from its receiving end portion in a direction opposite to the direction of movement of the corn stalks as they are moved by said stalk conveyor.

10. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and being disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, and mechanism for rotating said auger conveyor to cause the same to engage the forward ends of the corn stalks as they move forwardly from the discharge terminal of said stalk conveyor and direct them downwardly through said rolls, each of said rolls having receiving end portions and discharging end portions, the former being disposed at a somewhat higher level than the latter, said receiving end portions constituting snapping rolls and said discharging end portions of said rolls constituting husking rolls.

11. In a corn husking machine, the combination of a substantially horizontally disposed stalk conveyor for moving the stalks forwardly into the machine and having a discharge terminal, at least one pair of parallel oppositely rotating cooperating rolls having a receiving side and a discharge side and being disposed below the discharge terminal of said conveyor for receiving stalks therefrom, an upright auger conveyor mounted for rotation about its longitudinal axis and extending substantially normal to said stalk conveyor in spaced relation to and ahead of the discharge terminal thereof, said auger conveyor extending longitudinally upwardly from a point adjacent the receiving side of said rolls to a level above the discharge terminal of said stalk conveyor, mechanism for rotating said auger conveyor to cause the same to engage the forward ends of the corn stalks as they move forwardly from the discharge terminal of said stalk conveyor and direct them downwardly through said rolls, each of said rolls having a receiving end portion disposed directly below the discharge terminal of said stalk conveyor and each extending downwardly from its receiving end portion in a direction opposite to the direction of movement of the corn stalks as they are moved by said stalk conveyor, and a cooperating upright auger conveyor mounted for rotation about its longitudinal axis adjacent said first mentioned auger conveyor and cooperating therewith to engage the corn stalks and urge the same downwardly through said rolls, each of said auger conveyors having upper end portions by which they are mounted for rotation and each having free and otherwise unsupported lower end portions terminating adjacent said rolls.

References Cited in the file of this patent
UNITED STATES PATENTS

| | | |
|---|---|---|
| 762,438 | Pitkin | June 14, 1904 |
| 872,821 | Johnson | Dec. 3, 1907 |
| 976,850 | Cockrell | Nov. 29, 1910 |
| 1,722,717 | Trottman | July 30, 1929 |
| 2,458,791 | Messenger | Jan. 11, 1949 |
| 2,591,200 | Rosenthal | Apr. 1, 1952 |
| 2,648,943 | Shafer et al. | Aug. 18, 1953 |